Patented Oct. 17, 1939

2,176,819

UNITED STATES PATENT OFFICE 2,176,819

PRODUCING MOLYBDENUM ORANGE

Arthur Linz, New York, N. Y., and Lynn Wallace Coffer, Detroit, Mich., assignors to Climax Molybdenum Company, New York, N. Y., a corporation of Delaware No Drawing. Application July 23, 1938, Serial No. 221,002

2 Claims. (Cl. 134—58)

The present invention relates to new and useful improvements in the production of molybdenum orange pigments.

Molybdenum orange pigments are characterized by their enormous covering power, tinting strength, brilliance of color and extreme fastness to light and are now prepared commercially by adding a solution of a soluble bichromate, sulfate and molybdate to a solution of a soluble lead salt. The yellow precipitate which first forms is converted through successive shades of orange to a bright red provided the conditions under which the process is carried out are correct. The properties of the product depend entirely upon these conditions of preparation, with the effect that some of these which are not clearly understood give rise to difficulties in the commercial production of batches which match preceding batches.

It is also commonly supposed that the presence of lead sulphate is necessary to the formation of molybdenum orange despite the fact that Schultze in 1863 (Liebig's Annalen der Chemie (1863) vol. 126, p. 52) showed that it was possible to obtain homogeneous tetragonal crystals of lead molybdate containing up to 42 per cent of lead chromate, which crystals were deep dark red in color in contrast to the lighter red crystals of pure lead chromate.

Objects and advantages of the invention will be set forth in part hereinafter and in part will be obvious herefrom, or may be learned by practice with the invention, the same being realized and attained by means of the steps, instrumentalities and combinations pointed out in the appended claims.

The invention consists in the novel steps, processes, combinations and improvements herein shown and described.

The present invention has for its objects the provision of a novel and improved process for the commercial production of molybdenum orange under reproducible conditions. Another object of the invention is the provision of a novel and improved process for commercially producing a molybdenum orange which has more than usual tinctorial strength, brilliance of color and fastness to light. Still another object of the invention is the provision of a process in which the yield of molybdenum orange is improved.

In accordance with the present invention, molybdenum orange is prepared by mixing a solution of a soluble chromic acid salt and a soluble molybdic acid salt with a solution of a soluble lead salt, and preferably with the addition of a soluble salt forming another insoluble lead salt, the conditions of mixing being accurately controlled as to acidity, temperature, and preferably being maintained so that there is always an excess of lead in the mixed solution. The additional insoluble lead salt to be formed may be the conventional sufate, or alternatively may be one or more of many insoluble lead salts such as the borate, perborate, silicate, cyanide, nitroprusside and ferricyanide, chloride and carbonate.

Preferably, the mixed solutions are acid at the time of mixing, are then further acidified to assist in the development of the color and are finally treated with alkali so as to render them very slightly alkaline. After the formation of the molybdenum orange the mixed crystals are stabilized by the formation of a stabilizing substance such as aluminium hydroxide, after which the precipitate is separated and dried, preferably at a moderate or low temperature.

It will be understood that the foregoing general description and the following detailed description as well, are exemplary and explanatory of the invention but are not restrictive thereof.

Referring now in detail to the present preferred and illustrative manner of carrying out the process of the present invention, two solutions are prepared containing the following ingredients in substantially the following proportions:

Solution #1

Sodium bichromate
$Na_2Cr_2O_7.2H_2O$ _____ 1.15 kg. (3.85 mols)
Sodium molybdate
$Na_2MoO_4.2H_2O$ _____ .28 kg. (1.1 mols)
Potassium ferricyanide
$K_3Fe(CN)_6$ _____ .394 kg. (1.2 mols)
Sodium hydroxide NaOH___ .32 kg. (8.0 mols)

which are dissolved in 100 liters of water.

Solution #2

3.47 kg. (10.0 mols+5% excess) lead nitrate dissolved in 100 liters of water.

Other soluble chromic and molybdic acid salts may be employed in suitable proportions in place of the sodium salts, other alkalizing agents may be used and other soluble lead salts may be used in place of the lead nitrate. However, the salts specifically mentioned are preferred for reasons of economy.

The ratio of the molybdic and chromic acid salts specified gives the reddest color, although other ratios from 5 mol % to 30 mol % of lead molybdate may be used.

In the foregoing solutions an excess of lead nitrate is provided so as to make certain that there will be no excess chromate left in the solution, and an excess of sodium hydroxide is added so that the pH of the mixed solution after precipitation will be from pH 4.0 to 5.0 and preferably about pH 4.5, the amount of the sodium hydroxide being approximately that required to convert the sodium bichromate to sodium chromate.

The pH of Solution #2 should be adjusted, if necessary, to between pH 4.8 and pH 5.0, and this may be accomplished by varying the amount of sodium-hydroxide included in Solution #1, and in any event, the pH of the mixed solutions during precipitation should never be reduced below 3.0.

Solution #1 is added to Solution #2, thereby always maintaining an excess of the lead salt, and the mixing of the two solutions should be as rapid as possible so as to increase the supersaturation of the solutions, and so as to maintain the strength of the solutions as high as possible. Preferably, the temperature of the solutions at the time of mixing is 20 degrees C. or as much lower as is conveniently possible. Increased temperatures are objectionable only in that they increase the solubility of the constituents, thereby reducing the yield, and make the reaction somewhat harder to control due to increased reaction rate.

As soon as the precipitation is complete, the pH of the mixture is reduced by the addition of nitric acid until it is from 2.5 to 3.0 and at this pH the transformation of the precipitate to the tetragonal crystals of molybdenum orange is rapidly effected in a period of from 15 to 30 minutes. Lower pH values give a greater degree of transformation and a redder color, but the shade is not so readily controlled as when the pH is about 3.0. Furthermore, at the lower pH values, the time factor becomes increasingly important, and the undesirable secondary transformation of the crystals to the monoclinic form proceeds rather rapidly below pH 2.5. At pH 3.0, the stirring time may vary from one half hour to three or four hours if desirable from mechanical considerations.

After the desired color has been attained, a solution of .23 kg. of aluminium sulfate dissolved in two liters of water is added and thoroughly mixed, followed by the addition of 50 to 60 grams of sodium-hydroxide. The aluminium sulfate and the subsequent addition of sodium-hydroxide causes the formation of a protective film of aluminium hydroxide on the crystalline particles of molybdenum orange, which tends to stabilize the crystal form, prevents discoloration during drying, and reduces the action of light upon the pigment. In addition, the aluminium hydroxide film reduces the absorption of oil by the pigment and increases its brilliancy.

Care must be taken after the formation of the crystals in the acid solution that the additions of sodium hydroxide and other alkaline agents do not raise the pH too high, and it is advisable not to go much higher than neutral, although a pH as high as 8.5 can be used without causing the crystals to be transformed to the monoclinic form. With a final pH of 6.0 to 8.0, which is recommended, it is found that the precipitate settles rapidly, while with a lower pH the precipitate is flocculent and settles very slowly in the presence of aluminium hydroxide.

The precipitate may then be washed as desired, filtered, and dried at temperatures as high as 100° C. without appreciable loss in color, although lower drying temperatures are recommended.

Various changes may be made in the procedure specifically outlined above, and as an example, the quantity of potassium ferricyanide included in Solution #1 may be replaced with the proper quantity of any of the following substances:

| | Kilogram |
|---|---|
| $Na_2SO_4$ (sodium sulfate) | .17 |
| $Na_2B_4O_7.10H_2O$ (borax) | .487 |
| $NaBO_3.4H_2O$ (sodium perborate) | .184 |
| $Na_2SiO_3.9H_2O$ (sodium meta-silicate) | .340 |
| NaCl (sodium chloride) | .07 |
| NaI (sodium iodide) | .179 |
| NaCN (sodium cyanide) | .059 |
| $Na_2Fe(CN)_6NO.2H_2O$ (sodium nitroprusside) | .357 |
| $(NH_4)_2CO_3.H_2O$ (ammonium carbonate) | .137 |

Although these and many other substances may be used in place of the potassium ferricyanide, the color produced with the ferricyanide was stronger, more brilliant and more fast to light than that product using any of the other substances.

As an example of the process of producing molybdenum orange using only lead chromate and lead molybdate, the following examples may be given:

The Solution #1 above, is prepared in the manner described, omitting the potassium ferricyanide completely; that is, including only the sodium bichromate, molybdate and hydroxide. This solution is mixed with Solution #2, and the transformation from yellow to orange-red takes place in the same manner as in the presence of the ferricyanide or other third compound, and the resultant color is as strong and brilliant, but not quite so red.

Preferably, the mixed crystal precipitate should contain 10 to 12 mol percent of lead molybdate (2.5% to 3.0% Mo), as this gives the strongest color.

Although this procedure will give a satisfactory molybdenum orange composed solely of lead molybdate and chromate, the following procedure will be found to be preferable when the ferricyanide, sulfate or other third compound is not to be included:

*Solution #1*

| | Kilogram |
|---|---|
| Sodium bichromate ($Na_2Cr_2O_7.2H_2O$) | 1.196 |
| Sodium molybdate ($Na_2MoO_4.2H_2O$) | 0.242 |
| Sodium hydroxide (NaOH) | 0.400 |

Dissolved in 100 kg. of water.

*Solution #2*

| | Kilogram |
|---|---|
| Lead nitrate $(PbNO_3)_2$ | 3.64 |

Dissolved in 100 kg. of water.

These solutions are rapidly mixed by adding Solution #1 to Solution #2 with rapid constant stirring. After mixing the pH should be about 4.5, and when the precipitation has taken place, the pH is lowered to 2.5 to 3.0 by the addition of about 50 cc. of an acid such as nitric acid. After about one-half hour stirring the color is fully developed, and a solution of 60 g. of sodium aluminate ($NaAlO_2$) is added followed by enough sodium hydroxide to raise the pH to 6.0 to 8.0, care being taken not to exceed 8.5.

The pigment thus formed may be washed, though greater stability to drying is obtained when it is filtered directly since the washing tends to remove the excess lead salt which acts as stabilizer.

Care should be taken not to continue stirring too long after the color has developed since this has a tendency to promote the formation of monoclinic crystals which develop much more rapidly in the absence of slightly soluble lead salts other than chromate and molybdate.

The colors prepared by the procedure not including ferricyanide, sulfate, etc., are not quite so stable to drying, are a little more bulky, not quite so red and settle from solution more readily than the pigments prepared by using the third ingredient.

The invention in its broader aspects is not limited to the specific processes and steps described and departures may be made therefrom within the scope of the accompanying claims without departing from the principles of the invention and without sacrificing its chief advantages.

What we claim is:

1. A process for the production of molybdenum orange which includes mixing a solution of a soluble chromic acid salt and a soluble molybdic acid salt with a solution of soluble lead salt to form a precipitate at pH 3.0 to 5.0 and reducing the pH of the mixture containing the precipitate to 2.5 to 3.0 for the development of the color in the precipitate.

2. A process for the production of molybdenum orange which includes mixing a solution of a soluble chromic acid salt and a soluble molybdic acid salt with a solution of a soluble lead salt to form a precipitate at pH 4.0 to 5.0 and reducing the pH of the mixture containing the precipitate to 3.0 for the development of the color in the precipitate.

ARTHUR LINZ.
LYNN WALLACE COFFER.